US008082585B1

(12) United States Patent
Givonetti

(10) Patent No.: US 8,082,585 B1
(45) Date of Patent: Dec. 20, 2011

(54) PROTECTING COMPUTERS FROM MALWARE USING A HARDWARE SOLUTION THAT IS NOT ALTERABLE BY ANY SOFTWARE

(75) Inventor: Raymond R. Givonetti, Knoxville, TN (US)

(73) Assignee: Raymond R. Givonetti, Knoxville, TN (US)

( * ) Notice: Subject to any disclaimer, the term of this patent is extended or adjusted under 35 U.S.C. 154(b) by 0 days.

(21) Appl. No.: 12/880,404

(22) Filed: Sep. 13, 2010

(51) Int. Cl.
*G06F 11/00* (2006.01)
*G08B 23/00* (2006.01)

(52) U.S. Cl. .............................. 726/22; 726/26; 713/188

(58) Field of Classification Search .................... 726/22, 726/23, 24, 25, 26; 713/188
See application file for complete search history.

(56) References Cited

U.S. PATENT DOCUMENTS

| | | | | |
|---|---|---|---|---|
| 4,388,695 A * | 6/1983 | Heinemann | .................... | 711/163 |
| 4,734,851 A * | 3/1988 | Director | .......................... | 711/154 |
| RE33,328 E * | 9/1990 | Director | .......................... | 711/152 |
| 5,581,507 A * | 12/1996 | Scherpenberg et al. | . | 365/189.09 |
| 5,654,934 A * | 8/1997 | Ohno | ....................... | 365/233.14 |
| 5,657,473 A * | 8/1997 | Killean et al. | ................. | 711/163 |
| 6,330,648 B1 * | 12/2001 | Wambach et al. | ............ | 711/163 |
| 6,598,165 B1 * | 7/2003 | Galasso | ......................... | 713/189 |
| 6,993,660 B1 * | 1/2006 | Libenzi et al. | ................. | 713/188 |
| 7,023,861 B2 * | 4/2006 | Makinson et al. | ............ | 370/401 |
| 7,072,211 B2 * | 7/2006 | Newell | ...................... | 365/185.04 |
| 7,269,851 B2 * | 9/2007 | Ackroyd | .......................... | 726/24 |
| 7,409,719 B2 * | 8/2008 | Armstrong et al. | ............. | 726/24 |
| 7,490,350 B1 * | 2/2009 | Murotake et al. | ............... | 726/11 |
| 7,523,502 B1 * | 4/2009 | Kennedy et al. | ................. | 726/24 |
| 7,636,856 B2 * | 12/2009 | Gheorghescu et al. | ....... | 713/188 |
| 7,698,744 B2 * | 4/2010 | Fanton et al. | .................... | 726/27 |
| 7,757,291 B2 * | 7/2010 | Rochette et al. | ................ | 726/24 |
| 7,765,374 B2 * | 7/2010 | Field et al. | ..................... | 711/163 |
| 2003/0017672 A1 * | 1/2003 | Katayama et al. | ............. | 438/257 |
| 2003/0099147 A1 * | 5/2003 | Deng et al. | ............... | 365/230.05 |
| 2004/0065918 A1 * | 4/2004 | Katayama et al. | ............. | 257/324 |
| 2004/0088513 A1 * | 5/2004 | Biessener et al. | ............. | 711/173 |
| 2004/0190352 A1 * | 9/2004 | Watanabe et al. | ............. | 365/191 |
| 2004/0241944 A1 * | 12/2004 | Katayama et al. | ............. | 438/267 |
| 2004/0268322 A1 * | 12/2004 | Chow et al. | .................... | 717/136 |
| 2005/0172338 A1 * | 8/2005 | Sandu et al. | .................... | 726/22 |
| 2005/0188272 A1 * | 8/2005 | Bodorin et al. | ................. | 714/38 |
| 2005/0259484 A1 * | 11/2005 | Newell | .......................... | 365/191 |
| 2005/0262334 A1 * | 11/2005 | Scudder | ........................... | 713/1 |
| 2006/0031940 A1 * | 2/2006 | Rozman et al. | .................. | 726/27 |
| 2006/0112281 A1 * | 5/2006 | Nobre | .......................... | 713/188 |
| 2006/0136720 A1 * | 6/2006 | Armstrong et al. | ........... | 713/164 |
| 2006/0195653 A1 * | 8/2006 | Murphy | ........................ | 711/112 |
| 2006/0209595 A1 * | 9/2006 | Newell | ...................... | 365/185.04 |
| 2006/0265761 A1 * | 11/2006 | Rochette et al. | ................ | 726/27 |
| 2007/0016952 A1 * | 1/2007 | Stevens | .......................... | 726/24 |
| 2007/0150685 A1 * | 6/2007 | Shevchenko | ................. | 711/167 |
| 2007/0174910 A1 * | 7/2007 | Zachman et al. | ............... | 726/18 |
| 2007/0214331 A1 * | 9/2007 | Murphy | ........................ | 711/163 |
| 2007/0294768 A1 * | 12/2007 | Moskovitch et al. | ........... | 726/24 |
| 2008/0066183 A1 * | 3/2008 | George et al. | ................... | 726/27 |

(Continued)

*Primary Examiner* — David Garcia Cervetti

(57) ABSTRACT

A Computer System that protects itself from Malware by assuring the security of critical software elements including but not limited to Operating Systems, Applications and I/O Drivers. These critical software elements cannot be altered by Malware during normal operation of the Computer especially when connected to the Internet, the primary vehicle for malware. When deviating from normal computer operation such as downloading updated Operating Systems or secured Applications, this invention erases or blocks all memory that could possibly be contaminated with Malware from affecting the critical software elements. This invention is unique because the Malware protection is invoked and implemented by hardware not alterable by any software, or dependent on understanding existing or new Malware.

15 Claims, 10 Drawing Sheets

U.S. PATENT DOCUMENTS

| | | | |
|---|---|---|---|
| 2008/0115204 A1* | 5/2008 | Ramsey et al. | 726/13 |
| 2008/0183996 A1* | 7/2008 | Field et al. | 711/163 |
| 2008/0184371 A1* | 7/2008 | Moskovitch et al. | 726/24 |
| 2008/0189530 A1* | 8/2008 | McIntosh et al. | 712/227 |
| 2008/0263654 A1* | 10/2008 | Bahl et al. | 726/15 |
| 2008/0320313 A1* | 12/2008 | Awad et al. | 713/189 |
| 2008/0320423 A1* | 12/2008 | Awad et al. | 716/5 |
| 2010/0031358 A1* | 2/2010 | Elovici et al. | 726/24 |
| 2010/0043072 A1* | 2/2010 | Rothwell | 726/24 |
| 2010/0125913 A1* | 5/2010 | Davenport et al. | 726/25 |
| 2010/0154056 A1* | 6/2010 | Smith et al. | 726/22 |
| 2010/0205666 A1* | 8/2010 | Pernia | 726/16 |

* cited by examiner

PROTECTING COMPUTERS FROM MALWARE USING A HARDWARE SOLUTION THAT IS NOT ALTERABLE BY ANY SOFTWARE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The present invention pertains to the field of computers and more particularly to the protection of computers from malware.

2. Description of the Related Art

Malware is a general name for all malicious software designed to infiltrate a computer for a variety of reasons such as adware (forced ads/black market), retrieving credit card information, child pornography, spam, intercepting website payments, etc. Examples of techniques utilized include concealment vehicles (Trojan Horse, Rootkits, Backdoors), Spyware to gather information about the user, Viruses which spread the contamination to other executables, Worms that spread contaminants to other computers in a network, Key Logger which intercepts user's keystokes and Botnets that propagate malware on chat systems. Although Viruses are a subset of malware, the term Virus has been used as a label that envelopes all threats.

The most common pathways for malware are the World Wide Web and e-mail. However external memory storage devices such as CDs, DVDs, Floppy Disks and Flash Drives can be vehicles for malware.

In about a decade, malware has evolved from a few pranks to the current large global industry focused intensely on how to capitalize on the vulnerability of computer systems. Computer systems and anti-malware software are continuously updated because it has only been a matter of time before they are infiltrated by the incalculable great number of opportunists around the globe.

Firewalls are the first lines of malware defense, sometimes provided with the OS (Operating System), provide a gateway to the internet that permits network traffic based on a set of rules/criteria that may include IP addresses, domain names, protocols, and allowable ports.

Malware protection usually under the label of Virus protection supplied with or purchased for computers, provide real time and program scanning functions. The scanning function is usually time consuming since each program, primarily the OS, is scanned for characteristics of a particular threat. When the contamination is severe, disabling the computer, sophisticated scanning, usually done by computer service centers, is performed to remove the malware; often times resulting in a total erasing of the hard drive.

Some real time malware protection intercept the incoming data to a buffer or use a virtual machine for examination of certain characteristics prior to sending executable code to the computer processor. Examples of characteristics filtered are specific malware characteristics, data formats consistent with existing files, file trust lists, and executable code comparison to a white list.

Firewall/Malware/Virus programs require continuous updating because of the constant barrage of new threats.

Unlike existing art, this invention provides a hardware solution, not alterable by any software (old or new malware), that protects critical software elements (Operating System, secure Applications, I/O Drivers) plus minimizes memory that could potentially be contaminated by malware.

Typical of the art are those devices disclosed in the following U.S. Patents:

| U.S. Pat. No. | Inventor(s) | Date |
| --- | --- | --- |
| 6,993,660 B1 | Libenzi et al. | Jan. 31, 2006 |
| 7,023,861 B2 | Makinson et al. | Apr. 4, 2006 |
| 7,269,851 B2 | Ackroyd et al. | Sep. 11, 2007 |
| 7,409,719 B2 | Armstrong | Aug. 5, 2008 |
| 7,490,350 B1 | Murotake et al. | Feb. 10, 2009 |
| 7,523,502 B1 | Kennedy et al. | Apr. 21, 2009 |
| 7,636,856 B2 | Gheorghescu et al. | Dec. 22, 2009 |
| 7,698,744 B2 | Fanton et al. | Apr. 13, 2010 |
| 7,757,291 B2 | Rochette et al. | Jul. 13, 2010 |
| 7,765,374 B2 | Field et al. | Jul. 27, 2010 |
| 20040268322 A1 | Chow et al. | Dec. 30, 2004 |
| 20050172338 A1 | Sandu et al. | Aug. 4, 2005 |
| 20050188272 A1 | Bodorin et al. | Aug. 25, 2005 |
| 20060136720 A1 | Armstrong et al. | Jun. 22, 2006 |
| 20060265761 A1 | Rochette et al. | Nov. 23, 2006 |
| 20070016952 A1 | Stevens | Jan. 18, 2007 |
| 20070150685 A1 | Douglas J. Hohlbein | Nov. 13, 2001 |
| 20070294768 A1 | Moskovitch et al. | Dec. 20, 2007 |
| 20080183996 A1 | Field et al. | Jul. 31, 2008 |
| 20080184371 A1 | Moskovitch et al. | Jul. 31, 2008 |
| 20100043072 A1 | Rothwell | Feb. 18, 2010 |
| 20100125913 A1 | Davenport etal. | May 20, 2010 |
| 20100154056 A1 | Smith et al. | Jun. 17, 2010 |

BRIEF SUMMARY OF THE INVENTION

A Computer System that protects itself from malware by assuring the security of critical software elements including but not limited to Operating Systems, Applications and I/O Drivers. These critical software elements cannot be altered by malware during normal operation of the Computer especially when connected to the Internet, the primary vehicle for malware. When deviating from normal computer operation such as downloading updated Operating Systems or secured Applications, this invention erases or blocks all memory that could possibly be contaminated with Malware from affecting the critical software elements. This invention is unique because the malware protection is invoked and implemented by hardware not alterable by any software, or dependent on understanding existing or new Malware.

During normal computer operation of the computer, the ultimate protection of the critical software elements (Operating Systems, Secured Applications and I/O Drivers) is achieved with dedicated non-volatile (NV) memory that is hardware write protected. There is no possibility for malware software to alter the write protect mode or infiltrate the hardware protected critical software NV memory.

The Paging/Swapping memory is also isolated for two reasons. The first reason is that it cannot be write protected during normal operation because of its role as virtual memory. The second is that as an independent memory it can be a volatile (V) or non-volatile (NV) memory. It is very desirable to permit easy erasing of the Paging/Swapping memory to clear out any possible malware contamination at certain times. For example, if the Paging/Swapping memory is Random Access Memory (RAM) it will be automatically cleared when power is removed.

The third memory area is non-volatile (NV) isolated memory for data files, unsecured applications, and application support files such as e-mail and word processing documents. This memory area is referred to as the Data memory and is the only NV memory that could possibly contain malware contamination. This Data memory permits erasing if necessary.

Memory Gates are used to block all memory areas that could contain malware contamination from infiltrating any other computer function to assure that this contamination cannot affect a secure downloading process. An example of a secure downloading process is the downloading of an updated version of an Operating System (OS). Note that the write protection of the critical software elements, including the OS, is deactivated for the update. The memory areas that are blocked are all areas that could be malware contaminated including the Data memory, the Paging/Swapping memory if not easily erasable and external memories (Floppy Disks, Flash Drives, etc.).

The invention features discussed above are enhanced with emerging technologies that will allow the implementation of new volatile (V) and new Solid State Drives that can be erased easily and provide more independent memory areas to: 1. separate uncontaminated files (generated internally) from possible contaminated files (received via the internet) and 2. provide critical software elements separation for individual write-protection deactivation. The detailed description will describe various embodiments using different memory technologies.

BRIEF DESCRIPTION OF THE SEVERAL VIEWS OF THE DRAWINGS

The above mentioned features of the invention will become more clearly understood from the following detailed description of the invention read together with the drawings in which.

DETAILED DESCRIPTION OF THE INVENTION

A Computer System that protects itself from malware by assuring the security of critical software elements including but not limited to Operating Systems, Applications and I/O Drivers. These critical software elements cannot be altered by malware during normal operation of the Computer especially when connected to the internet, the primary vehicle for malware. When deviating from normal computer operation such as downloading updated Operating Systems or secured Applications, this invention erases or blocks all memory that could possibly be contaminated with malware from affecting the critical software elements. This invention is unique because the malware protection is invoked and implemented by hardware not alterable by any software, or dependent on understanding existing or new malware.

Figure 1:
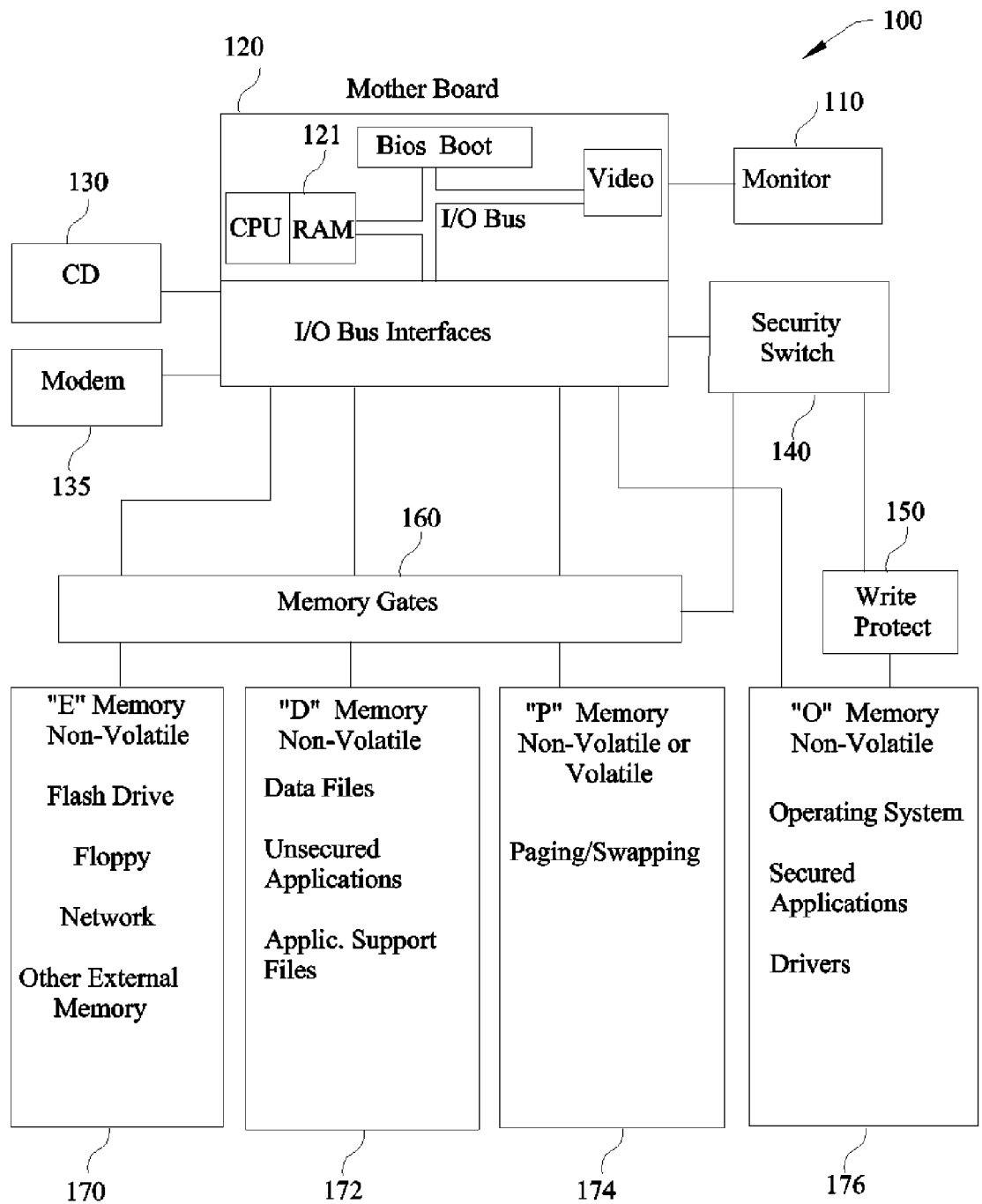
FIG. 1 is a generic block diagram showing the augmentation of a computer system. The Mother Board 120, Monitor 110, CD 130, Modem 135 and External memory 170 are elements of the existing computer system. In addition, a typical single Hard Drive is replaced with three memory areas "D" Memory 172, "P" Memory 174, "O" Memory 176. Elements of this invention include Memory Gates 160, Security Switch 140, Write Protect 150, "O" Memory 176, "P" Memory 174 and "D" Memory 172.

FIG. 1 is a generic block diagram showing the augmentation of a computer system. The Mother Board 120, Monitor 110, CD 130, Modem 135 and external memory 170 are elements of an existing computer system. In addition, a typical single Hard Drive is replaced with three memory areas "D" Memory 172, "P" Memory 174, "O" Memory 176. Elements of this invention include Memory Gates 160, Security Switch 140, Write Protect 150, "O" Memory 176, "P" Memory 174 and "D" Memory 172.

Figure 8:
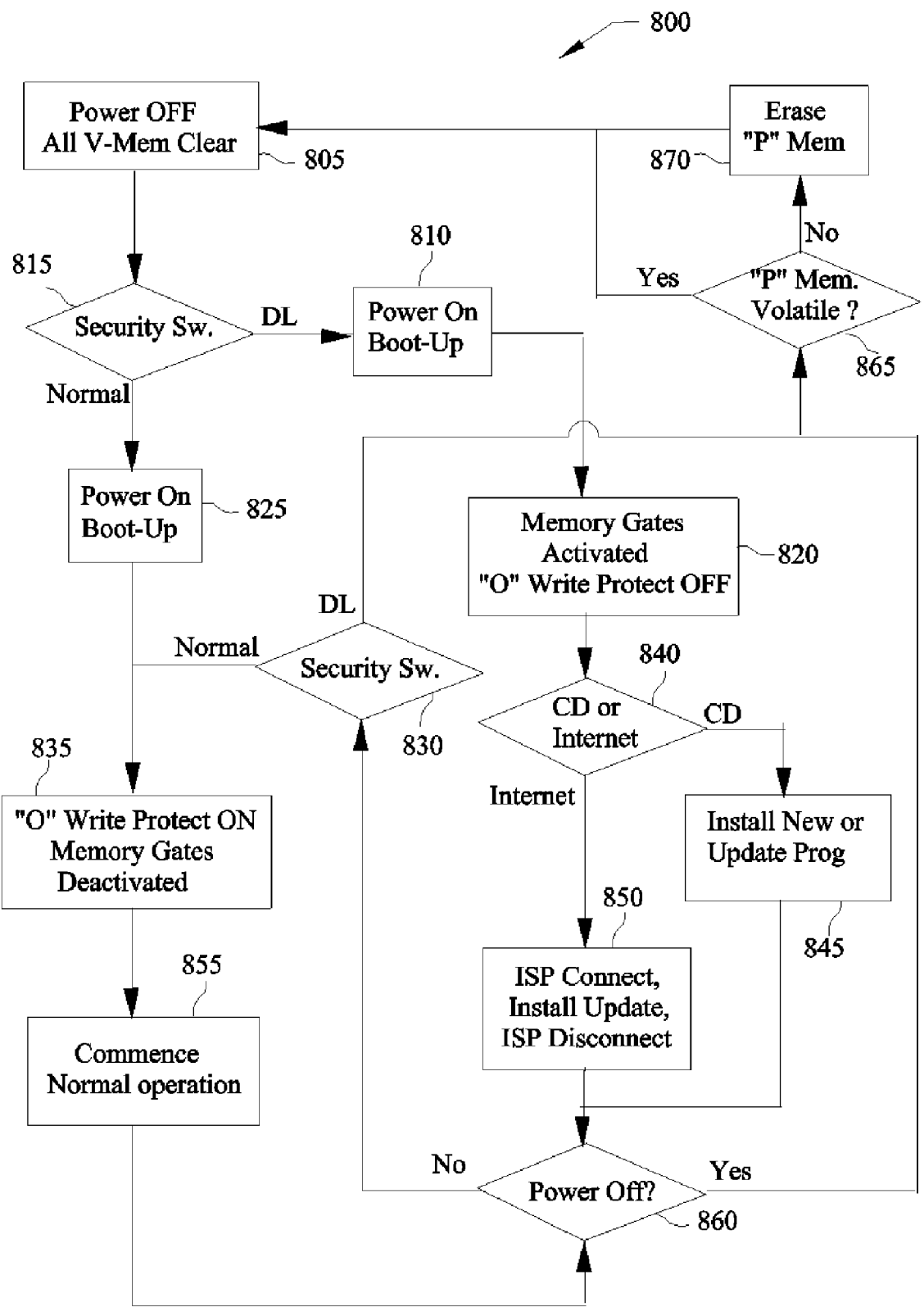
FIG. 8 is a generic operational flow diagram depicting how the critical software elements (Operational System, secure/permanent Applications, Drivers, etc.) are protected during normal operation and when down loading new/updated critical software.

The following generic description will reference FIG. 8 (Operational Flow Diagram) and FIG. 1. Normal operation can start with operation 805 indicating Power is OFF forcing all volatile memory to clear including RAM 121 memory and "P" Memory 174 if configured with volatile memory. Cleansing RAM 121 memory and "P" Memory 174 of possible malware eliminates contamination from previous operations affecting subsequent operations.

IF the Security Switch 140 in argument 815 decision is "Normal", Power is applied and Boot-UP is started per operation 825. Operation 825 then proceeds to operation 835 where "O" Memory 176 is write-protected via Write Protect 150. Operation 835 also deactivates Memory Gates 160. At this point the critical software elements that reside in the "O" Memory are protected from malware and normal computer 100 system operation 855 can commence such as word processing, web browsing and loading/running temporary internet applications. Normal operation 855 remains in effect until argument 860 decision to shut down is "Yes" or if the Security Switch 140 argument 830 decision is "DL" (download), then argument 865 is broached. Argument 865 asks if the "P" Memory is volatile; if the "P" Memory is volatile, then Power is removed per operation 805. If argument 865 indicates the "P" Memory is not volatile, then the "P" Memory 174 is erased per operation 870; this assures that the "P" Memory 174 is cleared along with all other RAM 121 per operation 805 before subsequent argument 815 decides to download or proceed with normal operations.

Back to the Security Switch 140 and argument 815, given the decision is "DL", Power is applied per operation 810. Per operation 820 Memory Gates 160 is then activated and "O" memory 176 write-protection is deactivated per Write Protect 150. At the conclusion of operation 820, the argument 840 asks if the download is from the internet or an external CD 130 memory. It is important to note, at this time when the "O" Memory 176 is not write-protected, that all memories that could be contaminated with malware are either cleared or blocked by Memory Gates 160 from any process assuring a sterile environment for downloading critical software elements.

If argument 840 is "CD", operation 845 allows the downloading of a new or updated secure program. If the argument 840 is "Internet", then the internet is connected, a secure program is downloaded, and internet is disconnected per operation 850. Outputs of operations 845 and 850 combine and return to previously encountered argument 860 asking if power should be removed.

Figure 2:
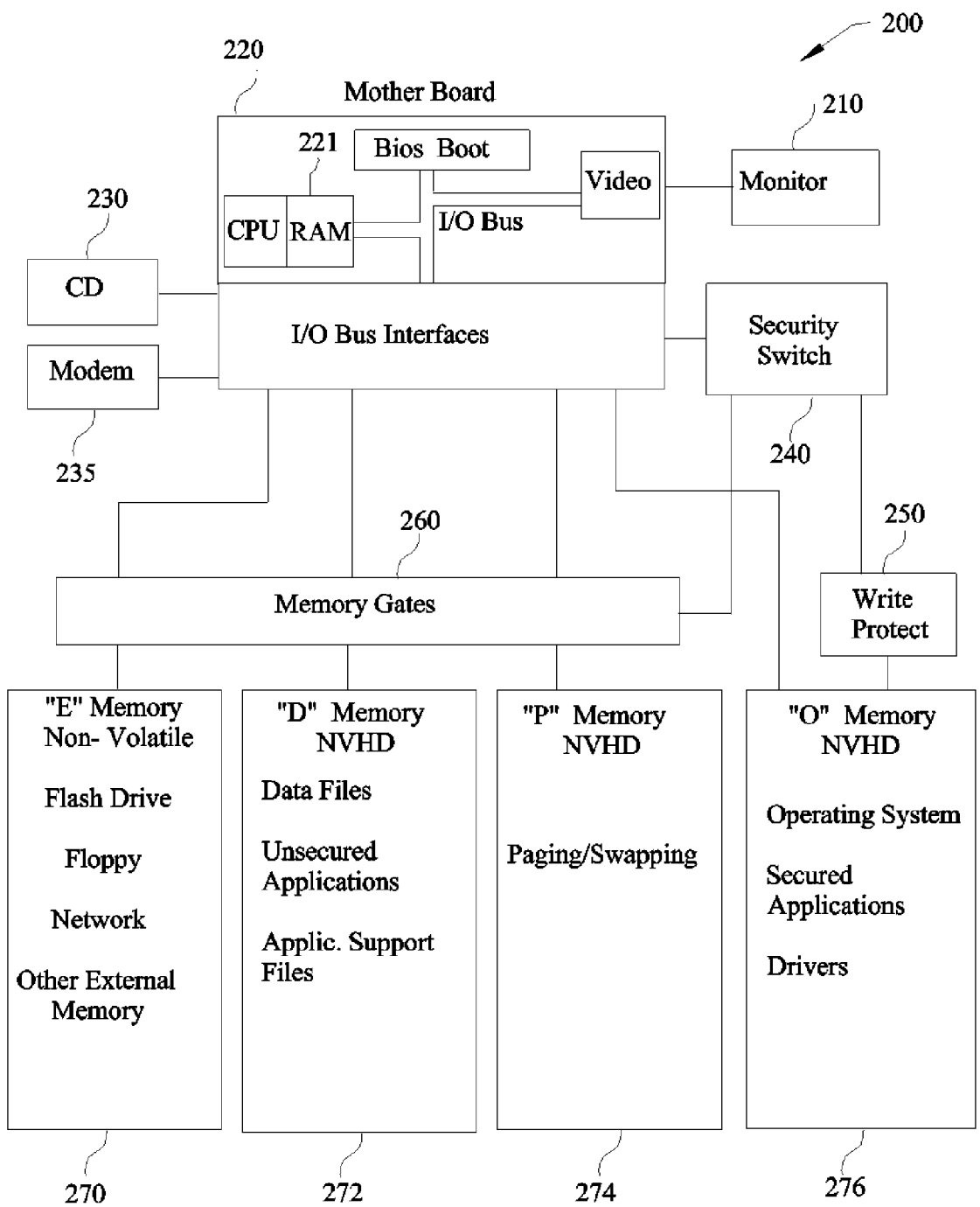
FIG. 2 is a refinement of FIG. 1 where the "O" Memory 276 is a Non-Volatile Hard Drive (NVHD), the "P" Memory 274 is a Non-Volatile Hard Drive (NVHD) and the "D" Memory 272 is a Non-Volatile Hard Drive (NVHD).

The first embodiment block diagram is FIG. 2 which is a refinement of FIG. 1 (generic block diagram); the "O" Memory 276 is a Non-Volatile Hard Drive (NVHD), the "P" Memory 274 is a Non-Volatile Hard Drive (NVHD) and the "D" Memory 272 is a Non-Volatile Hard Drive (NVHD). Each of these Hard Drives is independent of each other in all aspects of their functionality to assure the necessary isolation for writing, reading, erasing and write-protecting. In particular, the "O" Memory 276 is isolated to be write-protected as an independent entity as opposed to partition software protection that is vulnerable to malware. Also, the "P" Memory 274 is isolated to permit erasing or cleansing of possible malware.

Figure 9:
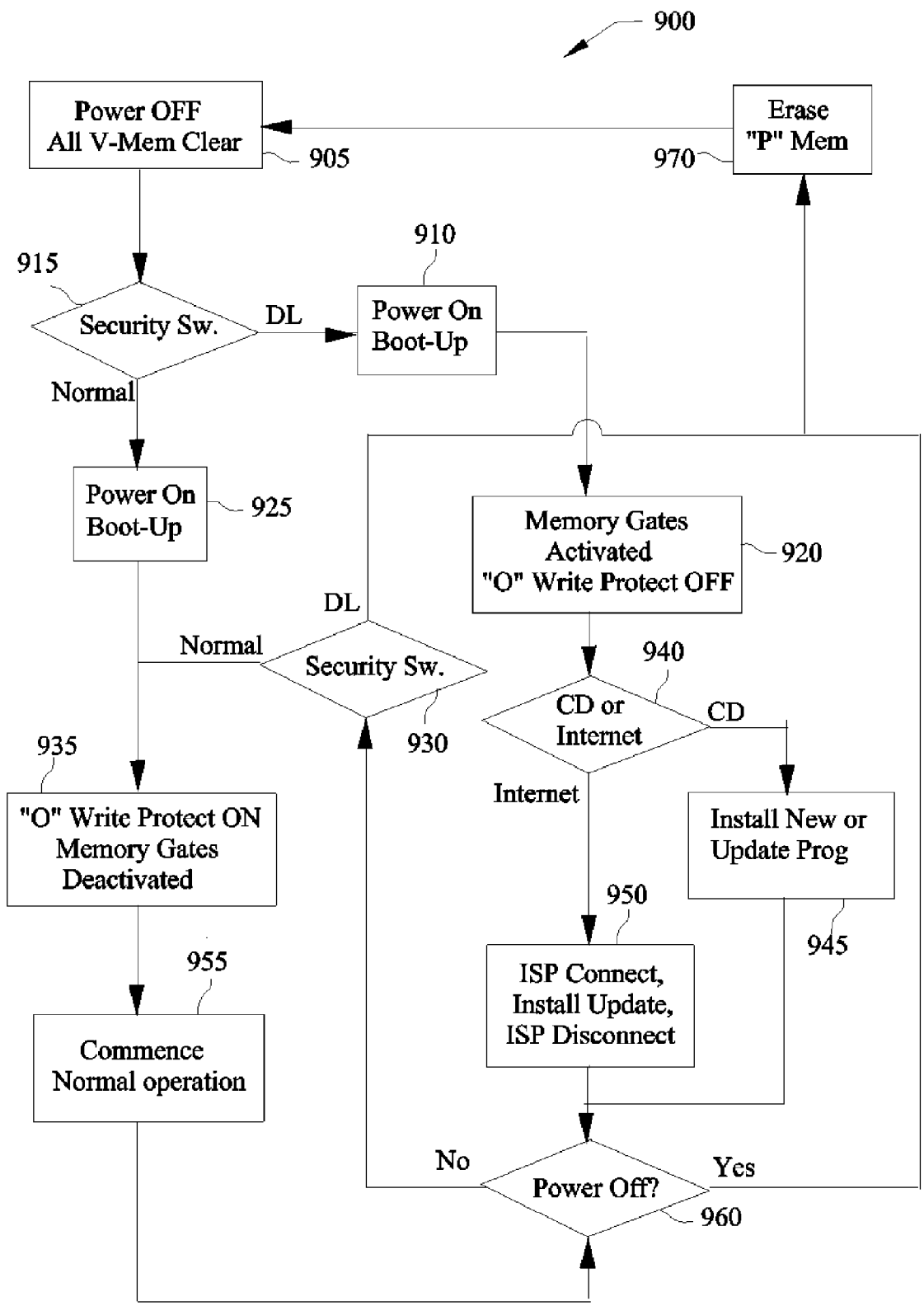
FIG. 9 is a operational flow diagram for a configuration using a non-volatile "P" Memory; depicting how the critical software elements (Operational System, secure/permanent Applications, Drivers, etc.) are protected during normal operation and when downloading new/updated critical software.

The following will reference FIG. 9 (Operational Flow Diagram) and FIG. 2. Normal operation can start with operation 905 indicating Power is OFF forcing all volatile memory to clear including RAM 221 memory. Cleansing RAM 221 memory of possible malware eliminates contamination from previous operations affecting subsequent operations.

IF the Security Switch 240 in argument 915 decision is "Normal", Power is applied and Boot-UP is started per operation 925. Operation 925 then proceeds to operation 935 where "O" Memory 276 is write-protected via Write Protect 250. Operation 935 also deactivates Memory Gates 260. At this point the critical software elements that reside in the "O" Memory are protected from malware and normal computer 200 system operation 955 can commence such as word processing, web browsing and loading/running temporary internet applications. Normal operation 955 remains in effect until argument 960 decision to shut down is "Yes" or if the Security Switch 240 argument 930 decision is "DL" (download), then the "P" Memory 274 is erased per operation 970; this assures that the "P" Memory 274 is cleared along with all other RAM 221 per operation 905 before subsequent argument 915 decides to download or proceed with normal operation. Erasing of the "P" Memory 274 which in this embodiment is a Non-Volatile Hard Drive (NVHD), can be erased using hard drive formatting techniques.

Back to the Security Switch 240 and argument 915, given the decision is "DL", Power is applied per operation 910. Per operation 920 Memory Gates 260 is then activated and "O" memory 276 write-protection is deactivated per Write Protect 250. At the conclusion of operation 920, the argument 940 asks if the download is from the internet or an external CD 230 memory. It is important to note, at this time when the "O" Memory 276 is not write-protected, that all memories that could be contaminated with malware are either cleared or blocked by Memory Gates 260 from any process assuring a sterile environment for downloading critical software elements.

If argument 940 is "CD", operation 945 allows the downloading of a new or updated secure program. If the argument 940 is "Internet", then the internet is connected, a secure program is downloaded, and internet is disconnected per operation 950. Outputs of operations 945 and 950 combine and return to previously encountered argument 960 asking if power should be removed.

In this embodiment, the Write Protect 250 function provides the necessary hardware interface between the Security Switch 240 and the "O" Memory 276 to activate or deactivate "O" Memory 276 write-protection. This Write Protect 250 is independent of the Mother Board 220 and its only input depends on the Security Switch 240. Write Protect 250 provides an indication of the write-protect status to the operator that is independent of all processes that can be affected by malware to preclude any false status.

The Security Switch 240 is a hardware implementation of a switch that activates or deactivates the Memory Gates 260 and Write Protect 250 functions. The Security Switch 240 is functionally the same as a single pole-double throw switch with make-before-brake contacts. For example, the Security Switch 240 can switch a logic "1" to the Memory Gates 260 and a logic "0" to Write Protect 250 with a logic "1" applied to both during the transition which eliminates vulnerability during the transition. The connection between the Security Switch 240 and the Mother Board 220 provides the status of the Security Switch 240 status to enable the status to be displayed on the Monitor 210; therefore allowing any Security Switch 240 hardware implementation (toggle switch, digital latch/s, etc.). Most importantly, like the Write Protect 250, the Security Switch 240 cannot be altered by any software and therefore is not vulnerable to malware.

The Memory Gates 260 function is to isolate all the non-volatile memories that could be contaminated by malware during normal operation, to assure a sterile environment for downloading secure/permanent critical programs. During this download process the Memory Gates 260 block the "E" Memory 270, the "D" Memory 272 and the "P" Memory 274. Blocking the "P" Memory 274 provides redundant protection since it is erased via operation 970 prior to downloading. This redundant blocking protection can offset erase concerns including the remote possibility that malware impacts the erase process. The hardware implementation of the Memory Gates 260 can be, but not limited to, two input digital AND gates on each output data line of E" Memory 270, the "D" Memory 272 and the "P" Memory 274. The second input to each AND gate is connected together and to the Security Switch 240.

Figure 3:
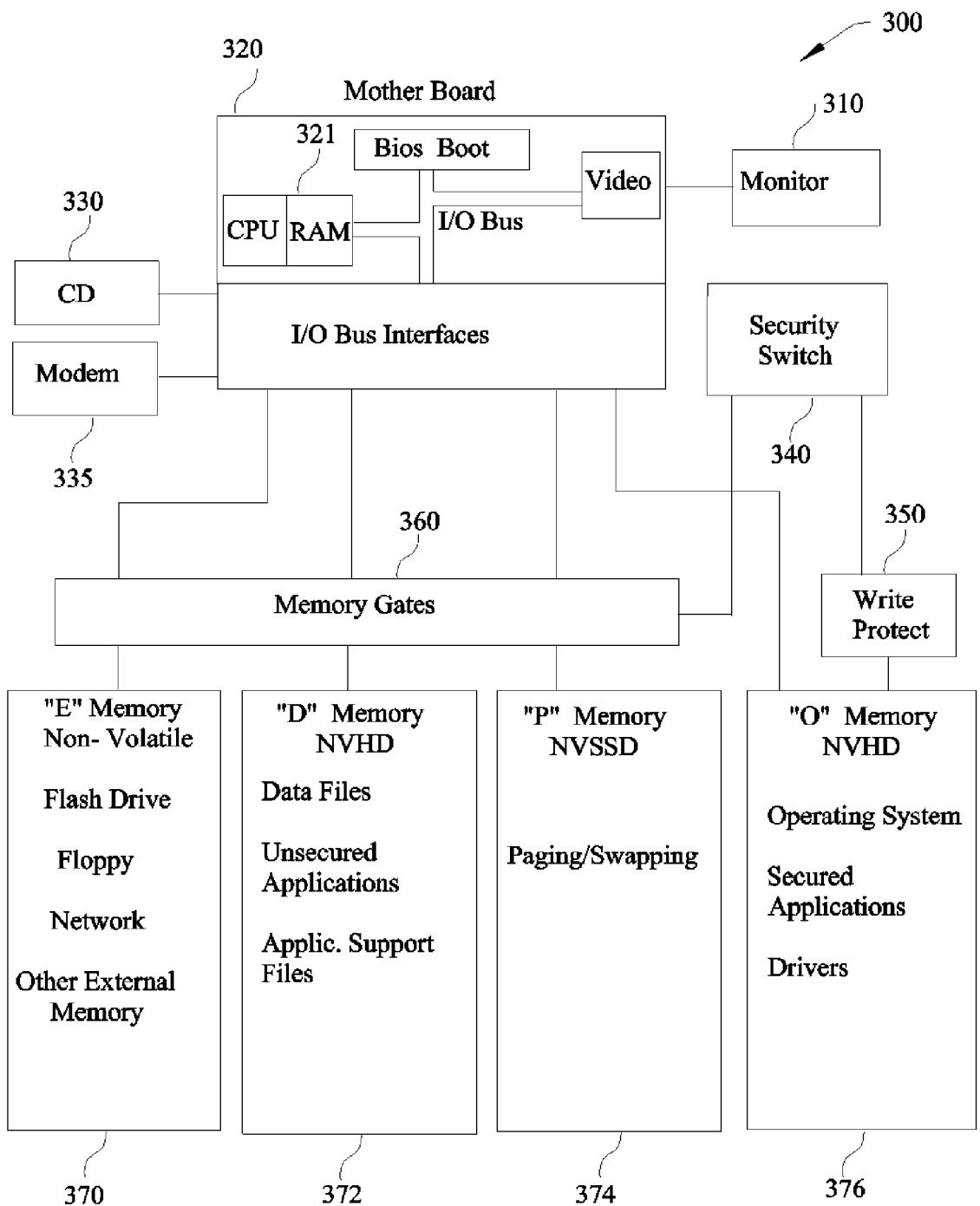
FIG. 3 is a refinement of FIG. 1 where the "O" Memory 376 is a Non-Volatile Hard Drive (NVHD), the "P" Memory 374 is a Non-Volatile Solid State Drive (NVSSD) and the "D" Memory 372 is a Non-Volatile Hard Drive (NVHD).

The second embodiment block diagram is FIG. 3 is a refinement of FIG. 1 (generic block diagram); the "O" Memory 376 is a Non-Volatile Hard Drive (NVHD), the "P" Memory 374 is a Non-Volatile Solid State Drive (NVSSD) and the "D" Memory 372 is a Non-Volatile Hard Drive (NVHD). Each of these memories is independent of each other in all aspects of their functionality to assure the necessary isolation for writing, reading, erasing and write-protecting. In particular, the "O" Memory 376 is isolated to be write-protected as an independent entity as opposed to partition software protection that is vulnerable to malware. Also, the "P" Memory 374 is isolated to permit erasing or cleansing of possible malware. There are a number of emerging NVSSD technologies that can be applied to the "P" Memory 374 such as EEPROM, Flash Drive, MRAM, FRAM and OUM. Most promising are MRAM and Flash Drive.

The following will reference FIG. 9 (Operational Flow Diagram) and FIG. 3. Normal operation can start with operation 905 indicating Power is OFF forcing all volatile memory to clear including RAM 321 memory. Cleansing RAM 321 memory of possible malware eliminates contamination from previous operations affecting subsequent operations.

IF the Security Switch 340 in argument 915 decision is "Normal", Power is applied and Boot-UP is started per operation 925. Operation 925 then proceeds to operation 935 where "O" Memory 376 is write-protected via Write Protect 350. Operation 935 also deactivates Memory Gates 360. At this point the critical software elements that reside in the "O" Memory are protected from malware and normal computer 300 system operation 955 can commence such as word processing, web browsing and loading/running temporary internet applications. Normal operation 955 remains in effect until argument 960 decision to shut down is "Yes" or if the Security Switch 340 argument 930 decision is "DL" (download), then the "P" Memory 374 is erased per operation 970; this assures that the "P" Memory 374 is cleared along with all other RAM 321 per operation 905 before subsequent argument 915 decides to download or proceed with normal operations. Erasing of the "P" Memory 374 which in this embodiment is a Non-Volatile Solid State Drive (NVSSD), can be erased using a self contained firmware process.

Back to the Security Switch 340 and argument 915, given the decision is "DL", Power is applied per operation 910. Per operation 920 Memory Gates 360 is then activated and "O" memory 376 write-protection is deactivated per Write Protect 350. At the conclusion of operation 920, the argument 940 asks if the download is from the internet or an external CD 330 memory. It is important to note, at this time when the "O" Memory 376 is not write-protected, that all memories that could be contaminated with malware are either cleared or blocked by Memory Gates 360 from any process assuring a sterile environment for downloading critical software elements.

If argument 940 is "CD", operation 945 allows the downloading of a new or updated secure program. If the argument 940 is "Internet", then the internet is connected, a secure program is downloaded, and internet is disconnected per operation 950. Outputs of operations 945 and 950 combine and return to previously encountered argument 960 asking if power should be removed.

In this embodiment, the Write Protect 350 function provides the necessary hardware interface between the Security Switch 340 and the "O" Memory 376 to activate or deactivate "O" Memory 376 write-protection. This Write Protect 350 is independent of the Mother Board 320 and its only input depends on the Security Switch 340. Write Protect 350 provides an indication of the write-protect status to the operator that is independent of all processes that can be affected by malware to preclude any false status.

The Security Switch 340 is a hardware implementation of a switch that activates or deactivates the Memory Gates 360 and Write Protect 350 functions. The Security Switch 340 is functionally the same as a single pole-double throw switch with make-before-brake contacts. For example, the Security Switch 340 can switch a logic "1" to the Memory Gates 360 and a logic "0" to Write Protect 350 with a logic "1" applied to both during the transition which eliminates vulnerability during the transition. The connection between the Security Switch 340 and the Mother Board 320 provides the status of the Security Switch 340 status to enable the status to be displayed on the Monitor 310; therefore allowing any Security Switch 340 hardware implementation (toggle switch, digital latch/s, etc.). Most importantly, like the Write Protect 350, the Security Switch 340 cannot be altered by any software and therefore is not vulnerable to malware.

The Memory Gates 360 function is to isolate all the non-volatile memories that could be contaminated by malware during normal operation, to assure a sterile environment for downloading secure/permanent critical programs. During this download process the Memory Gates 360 block the "E" Memory 370, the "D" Memory 372 and the "P" Memory 374. Blocking the "P" Memory 374 provides redundant protection since it is erased via operation 970 prior to downloading. This redundant blocking protection can offset erase concerns including the remote possibility that malware impacts the erase process. The hardware implementation of the Memory Gates 360 can be, but not limited to, two input digital AND gates on each output data line of E" Memory 370, the "D" Memory 372 and the "P" Memory 374. The second input to each AND gate is connected together and to the Security Switch 340.

Figure 4:
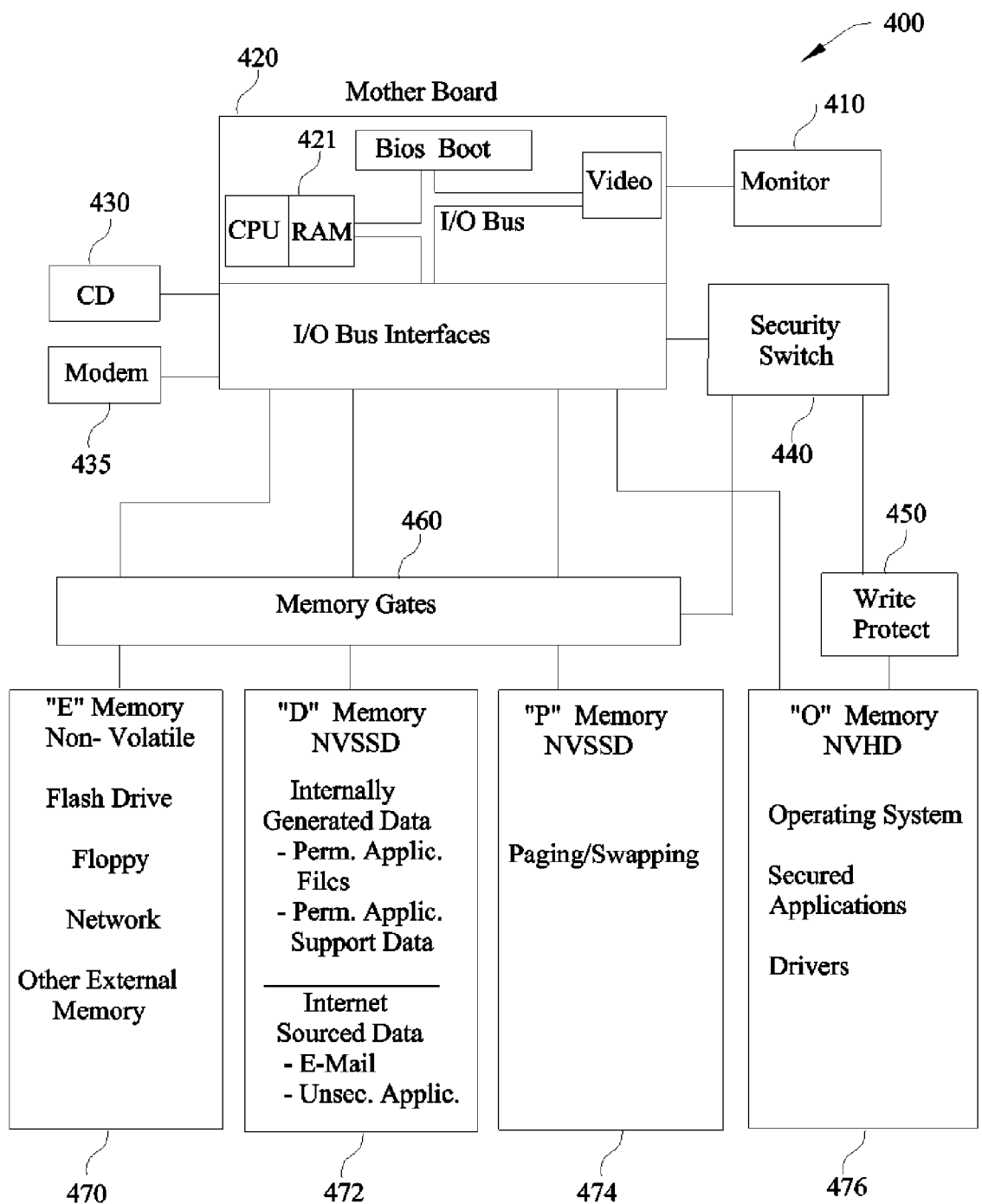
FIG. 4 is a refinement of FIG. 1 where the "O" Memory 476 is a Non-Volatile Hard Drive (NVHD), the "P" Memory 474 is a Non-Volatile Solid State Drive (NVSSD) and the "D" Memory 472 is a Non-Volatile Solid State Drive (NVSSD).

The third embodiment block diagram is FIG. 4 is a refinement of FIG. 1 (generic block diagram); the "O" Memory 476 is a Non-Volatile Hard Drive (NVHD), the "P" Memory 474 is a Non-Volatile Solid State Drive (NVSSD) and the "D" Memory 472 is a Non-Volatile Solid State Drive (NVSSD). Each of these memories is independent of each other in all aspects of their functionality to assure the necessary isolation for writing, reading, erasing and write-protecting. In particular, the "O" Memory 476 is isolated to be write-protected as an independent entity as opposed to partition software protection that is vulnerable to malware. Also, the "P" Memory 474 is isolated to permit erasing or cleansing of possible malware. There are a number of emerging NVSSD technologies that can be applied to the "P" Memory 474 and "D" memory 472 such as EEPROM, Flash Drive, MRAM, FRAM and OUM. Most promising are MRAM and Flash Drive.

The following will reference FIG. 9 (Operational Flow Diagram) and FIG. 4. Normal operation can start with operation 905 indicating Power is OFF forcing all volatile memory to clear including RAM 421 memory. Cleansing RAM 421 memory of possible malware eliminates contamination from previous operations affecting subsequent operations IF the Security Switch 440 in argument 915 decision is "Normal", Power is applied and Boot-UP is started per operation 925. Operation 925 then proceeds to operation 935 where "O" Memory 476 is write-protected via Write Protect 450. Operation 935 also deactivates Memory Gates 460. At this point the critical software elements that reside in the "O" Memory are protected from malware and normal computer 400 system operation 955 can commence such as word processing, web browsing and loading/running temporary internet applications. Normal operation 955 remains in effect until argument 960 decision to shut down is "Yes" or if the Security Switch 440 argument 930 decision is "DL" (download), then the "P" Memory 474 is erased per operation 970; this assures that the "P" Memory 474 is cleared along with all other RAM 421 per operation 905 before subsequent argument 915 decides to download or proceed with normal operation. Erasing of the "P" Memory 474 which in this embodiment is a Non-Volatile Solid State Drive (NVSSD), can be erased using a self contained firmware process.

Back to the Security Switch 440 and argument 915, given the decision is "DL", Power is applied per operation 910. Per operation 920 Memory Gates 460 is then activated and "O" memory 476 write-protection is deactivated per Write Protect 450. At the conclusion of operation 920, the argument 940 asks if the download is from the internet or an external CD 430 memory. It is important to note, at this time when the "O" Memory 476 is not write-protected, that all memories that could be contaminated with malware are either cleared or blocked by Memory Gates 460 from any process assuring a sterile environment for downloading critical software elements.

If argument 940 is "CD", operation 945 allows the downloading of a new or updated secure program. If the argument 940 is "Internet", then the internet is connected, a secure program is downloaded, and internet is disconnected per operation 950. Outputs of operations 945 and 950 combine and return to previously encountered argument 960 asking if power should be removed.

In this embodiment, the Write Protect 450 function provides the necessary hardware interface between the Security Switch 440 and the "O" Memory 476 to activate or deactivate "O" Memory 476 write-protection. This Write Protect 450 is independent of the Mother Board 420 and its only input depends on the Security Switch 440. Write Protect 450 provides an indication of the write-protect status to the operator that is independent of all processes that can be affected by malware to preclude any false status.

The Security Switch 440 is a hardware implementation of a switch that activates or deactivates the Memory Gates 460 and Write Protect 450 functions. The Security Switch 440 is functionally the same as a single pole-double throw switch with make-before-brake contacts. For example, the Security Switch 440 can switch a logic "1" to the Memory Gates 460 and a logic "0" to Write Protect 450 with a logic "1" applied to both during the transition which eliminates vulnerability during the transition. The connection between the Security Switch 440 and the Mother Board 420 provides the status of the Security Switch 440 status to enable the status to be displayed on the Monitor 410; therefore allowing any Security Switch 440 hardware implementation (toggle switch, digital latch/s, etc.). Most importantly, like the Write Protect 450, the Security Switch 440 cannot be altered by any software and therefore is not vulnerable to malware.

The Memory Gates 460 function is to isolate all the non-volatile memories that could be contaminated by malware during normal operation, to assure a sterile environment for downloading secure/permanent critical programs. During this download process the Memory Gates 460 block the "E" Memory 470, the "D" Memory 472 and the "P" Memory 474. Blocking the "P" Memory 474 provides redundant protection since it is erased via operation 970 prior to downloading. This redundant blocking protection can offset erase concerns including the remote possibility that malware impacts the erase process. The hardware implementation of the Memory Gates 460 can be, but not limited to, two input digital AND gates on each output data line of E" Memory 470, the "D" Memory 472 and the "P" Memory 474. The second input to each AND gate is connected together and to the Security Switch 440.

In addition to the advantages of VMS SD (speed, size and reliability) the "D" memory 472 can provide further isolation between internally generated uncontaminated data and internet generated potentially contaminated data. This substantially reduces the amount of data in the "D" memory that could be contaminated by isolating internet data in a dedicated memory that can be easily erased periodically or when malware is suspected of impacting performance.

Figure 5:
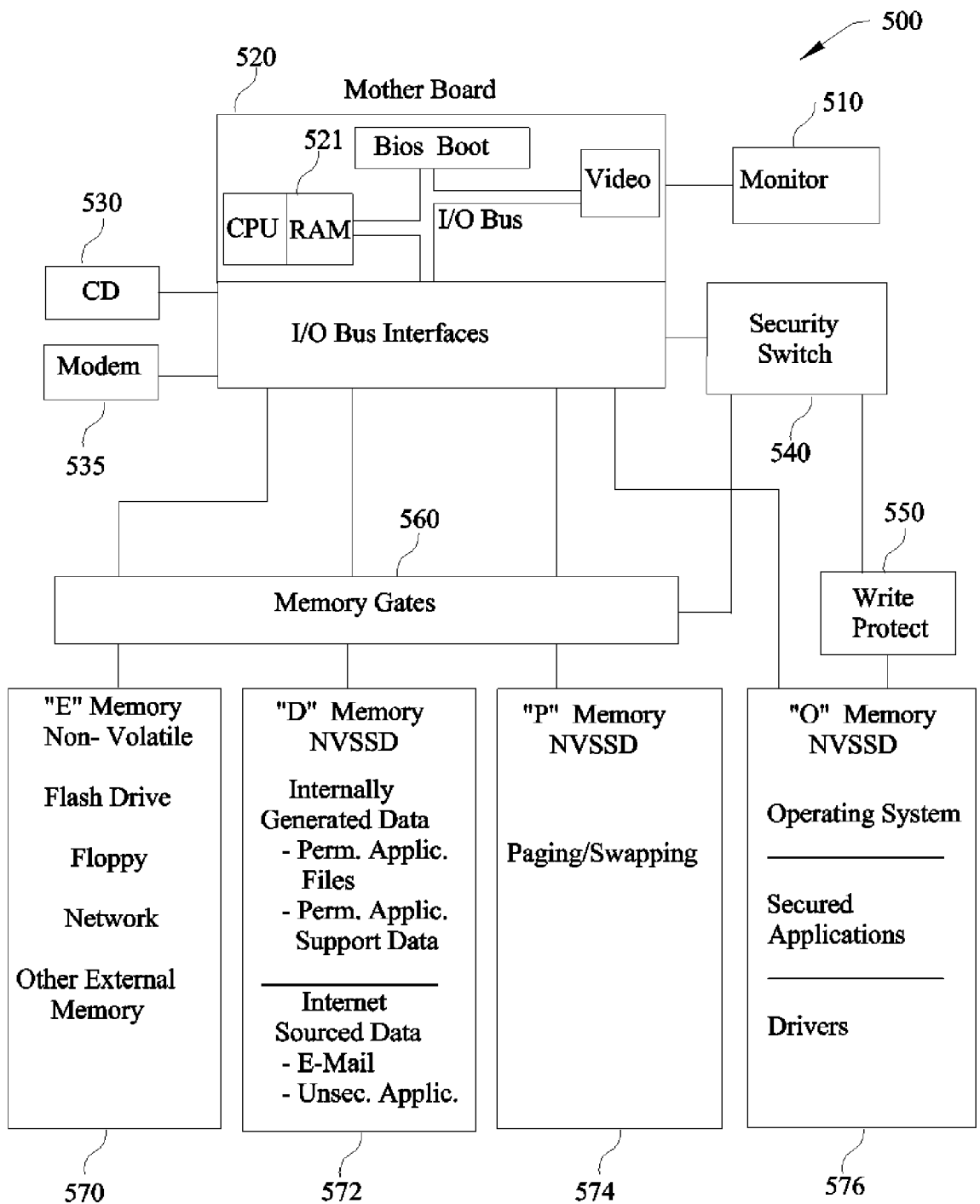
FIG. 5 is a refinement of FIG. 1 where the "O" Memory 576 is a Non-Volatile Solid State Drive (NSSD), the "P" Memory 574 is a Non-Volatile Solid State Drive (NVSSD) and the "D" Memory 572 is a Non-Volatile Solid State Drive (NVSSD).

The forth embodiment block diagram is FIG. 5 is a refinement of FIG. 1 (generic block diagram); the "O" Memory 576 is a Non-Volatile Solid State Drive (NVSSD), the "P" Memory 574 is a Non-Volatile Solid State Drive (NVSSD) and the "D" Memory 572 is a Non-Volatile Solid State Drive (NVSSD). Each of these memories is independent of each other in all aspects of their functionality to assure the necessary isolation for writing, reading, erasing and write-protecting. In particular, the "O" Memory 576 is isolated to be write-protected as an independent entity as opposed to partition software protection that is vulnerable to malware. Also, the "P" Memory 574 is isolated to permit erasing or cleansing of possible malware. There are a number of emerging NVSSD technologies that can be applied to the "O" Memory 576, "P" Memory 574 and "D" memory 572 such as EEPROM, Flash Drive, MRAM, FRAM and OUM. Most promising are MRAM and Flash Drive.

The following will reference FIG. 9 (Operational Flow Diagram) and FIG. 5. Normal operation can start with operation 905 indicating Power is OFF forcing all volatile memory to clear including RAM 521 memory. Cleansing RAM 521 memory of possible malware eliminates contamination from previous operations affecting subsequent operations.

IF the Security Switch 540 in argument 915 decision is "Normal", Power is applied and Boot-UP is started per operation 925. Operation 925 then proceeds to operation 935 where "O" Memory 576 is write-protected via Write Protect 550. Operation 935 also deactivates Memory Gates 560. At this point the critical software elements that reside in the "O" Memory are protected from malware and normal computer 500 system operation 955 can commence such as word processing, web browsing and loading/running temporary internet applications. Normal operation 955 remains in effect until argument 960 decision to shut down is "Yes" or if the Security Switch 540 argument 930 decision is "DL" (download), then the "P" Memory 574 is erased per operation 970; this assures that the "P" Memory 574 is cleared along with all other RAM 521 per operation 905 before subsequent argument 915 decides to download or proceed with normal operation. Erasing of the "P" Memory 574 which in this embodiment is a Non-Volatile Solid State Drive (NVSSD), can be erased using a self contained firmware process.

Back to the Security Switch 540 and argument 915, given the decision is "DL", Power is applied per operation 910. Per operation 920 Memory Gates 560 is then activated and "O" memory 576 write-protection is deactivated per Write Protect 550. At the conclusion of operation 920, the argument 940 asks if the download is from the internet or an external CD 530 memory. It is important to note, at this time when the "O" Memory 576 is not write-protected, that all memories that could be contaminated with malware are either cleared or blocked by Memory Gates 560 from any process assuring a sterile environment for downloading critical software elements.

If argument 940 is "CD", operation 945 allows the downloading of a new or updated secure program. If the argument 940 is "Internet", then the internet is connected, a secure program is downloaded, and internet is disconnected per operation 950. Outputs of operations 945 and 950 combine and return to previously encountered argument 960 asking if power should be removed.

In this embodiment, the Write Protect 550 function provides the necessary hardware interface between the Security Switch 540 and the "O" Memory 576 to activate or deactivate "O" Memory 576 write-protection. This Write Protect 550 is independent of the Mother Board 520 and its only input depends on the Security Switch 540. Write Protect 550 provides an indication of the write-protect status to the operator that is independent of all processes that can be affected by malware to preclude any false status.

The Security Switch 540 is a hardware implementation of a switch that activates or deactivates the Memory Gates 560 and Write Protect 550 functions. The Security Switch 540 is functionally the same as a single pole-double throw switch with make-before-brake contacts. For example, the Security Switch 540 can switch a logic "1" to the Memory Gates 560 and a logic "0" to Write Protect 550 with a logic "1" applied to both during the transition which eliminates vulnerability during the transition. The connection between the Security Switch 540 and the Mother Board 520 provides the status of the Security Switch 540 status to enable the status to be displayed on the Monitor 510; therefore allowing any Security Switch 540 hardware implementation (toggle switch, digital latch/s, etc.). Most importantly, like the Write Protect 550, the Security Switch 540 cannot be altered by any software and therefore is not vulnerable to malware.

The Memory Gates 560 function is to isolate all the non-volatile memories that could be contaminated by malware during normal operation, to assure a sterile environment for downloading secure/permanent critical programs. During this download process the Memory Gates 560 block the "E" Memory 570, the "D" Memory 572 and the "P" Memory 574. Blocking the "P" Memory 574 provides redundant protection since it is erased via operation 970 prior to downloading. This redundant blocking protection can offset erase concerns including the remote possibility that malware impacts the erase process. The hardware implementation of the Memory Gates 560 can be, but not limited to, two input digital AND gates on each output data line of E" Memory 570, the "D" Memory 572 and the "P" Memory 574. The second input to each AND gate is connected together and to the Security Switch 540.

In addition to the advantages of NVSSD (speed, size and reliability) the "D" Memory 572 can provide further isolation between internally generated uncontaminated data and internet generated potentially contaminated data. This substantially reduces the amount of data in the "D" Memory 572 that could be contaminated by isolating internet data in a dedicated memory that can be easily erased periodically or when malware is suspected of impacting performance.

In addition to the advantages of NVSSD (speed, size and reliability) the "O" memory 576 can provide further isolation between critical software elements permitting write protection to stay applied to the memory areas not requiring a download.

Figure 6:
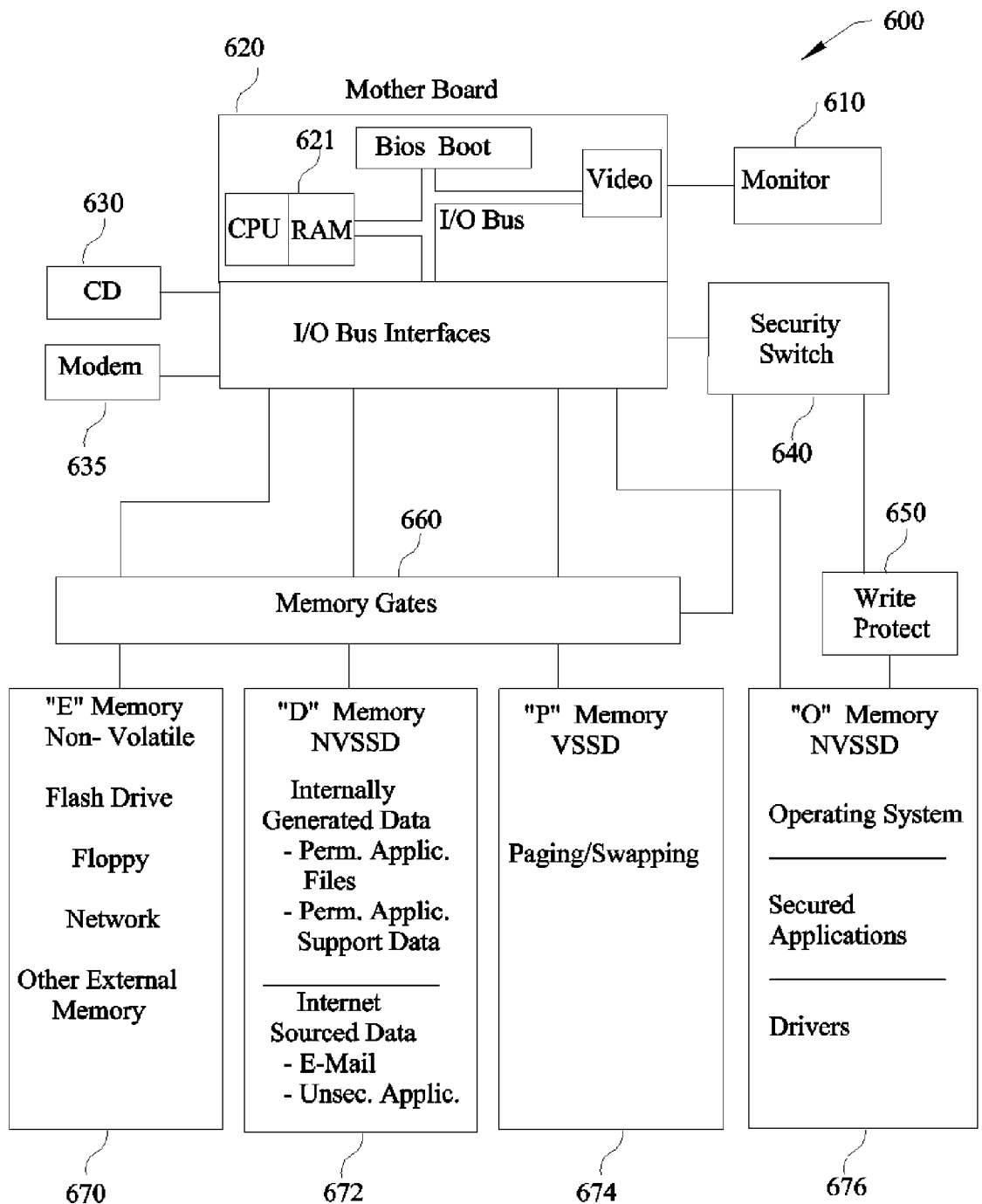
FIG. 6 is a refinement of FIG. 1 where the "O" Memory 676 is a Non-Volatile Solid State Drive (NSSD), the "P" Memory 674 is a Volatile Solid State Drive (VSSD) and the "D" Memory 672 is a Non-Volatile Solid State Drive (NVSSD).

The fifth embodiment block diagram is FIG. 6 is a refinement of FIG. 1 (generic block diagram); the "O" Memory 676 is a Non-Volatile Solid State Drive (NVSSD), the "P" Memory 674 is Volatile Solid State Drive (VSSD) and the "D" Memory 672 is a Non-Volatile Solid State Drive (NVSSD). Each of these memories is independent of each other in all aspects of their functionality to assure the necessary isolation for writing, reading, erasing and write-protecting. In particular, the "O" Memory 676 is isolated to be write-protected as an independent entity as opposed to partition software protection that is vulnerable to malware. Also, the "P" Memory 674 is isolated to permit erasing or cleansing of possible malware. There are a number of emerging NVSSD technologies that can be applied to the "O" Memory 676 and "D" memory 672 such as EEPROM, Flash Drive, MRAM, FRAM and OUM. Most promising are MRAM and Flash Drive. "P" Memory 674 will use RAM technologies.

Figure 10:
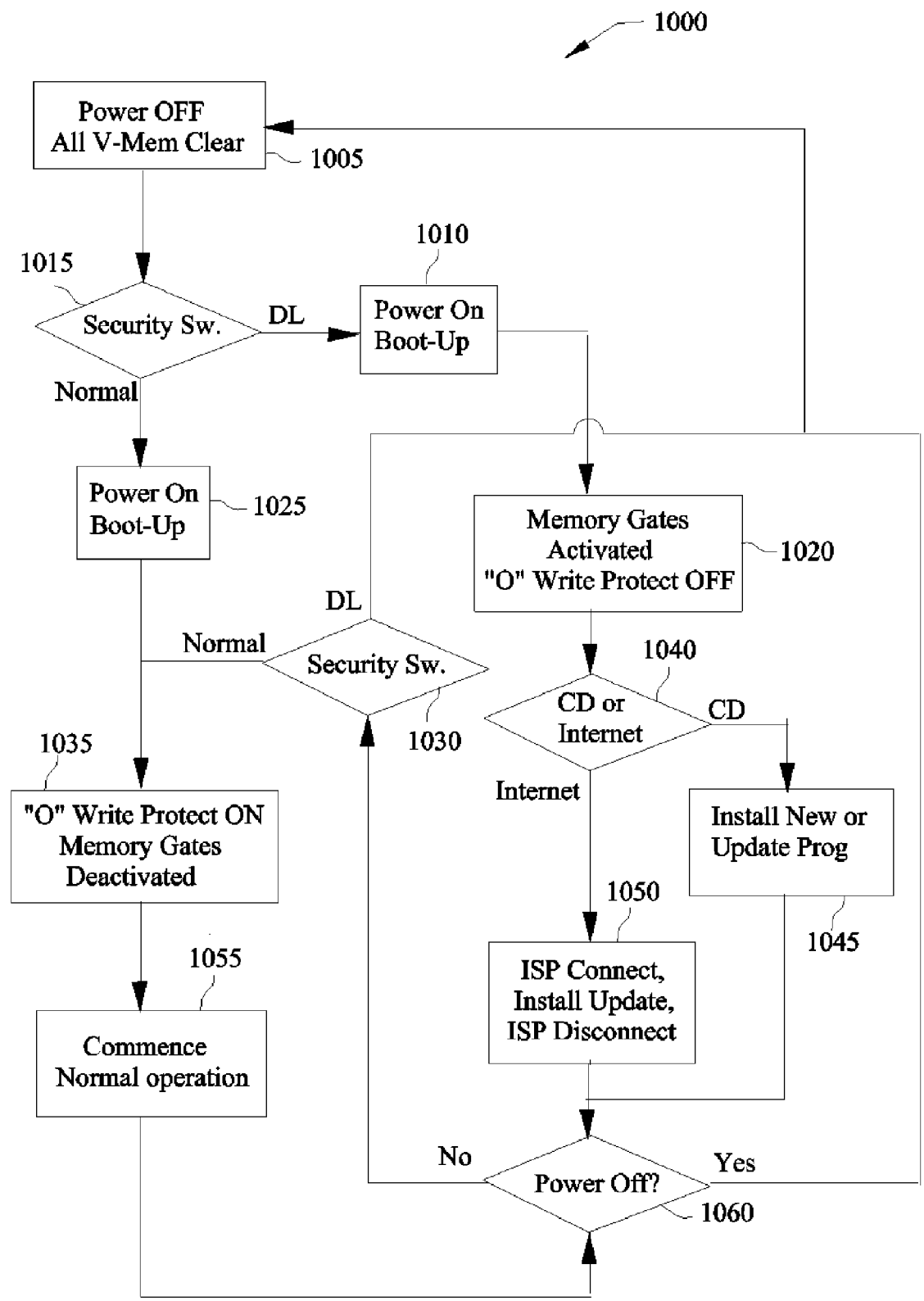
FIG. 10 is a operational flow diagram for a configuration using a volatile "P" Memory or without a "P" Memory; depicting how the critical software elements (Operational System, secure/permanent Applications, Drivers, etc.) are protected during normal operation and when downloading new/updated critical software.

The following will reference FIG. 10 (Operational Flow Diagram) and FIG. 6. Normal operation can start with operation 1005 indicating Power is OFF forcing all volatile memory to clear including RAM 621 memory and "P" Memory 674. Cleansing RAM 621 memory and "P" Memory 674 of possible malware eliminates contamination from previous operations affecting subsequent operations.

IF the Security Switch 640 in argument 1015 decision is "Normal", Power is applied and Boot-UP is started per operation 1025. Operation 1025 then proceeds to operation 1035 where "O" Memory 676 is write-protected via Write Protect 650. Operation 1035 also deactivates Memory Gates 660. At this point the critical software elements that reside in the "O" Memory are protected from malware and normal computer system 600 operation 1055 can commence such as word processing, web browsing and loading/running temporary internet applications. Normal operation 1055 remains in effect until argument 1060 decision to shut down is "Yes" or if the Security Switch 640 argument 1030 decision is "DL" (download), then the "P" Memory 674 is cleared along with all other RAM 621 per operation 1005 before subsequent argument 1015 decides to download or proceed with normal operation.

Back to the Security Switch 640 and argument 1015, given the decision is "DL", Power is applied per operation 910. Per operation 1020 Memory Gates 660 is then activated and "O" memory 676 write-protection is deactivated per Write Protect 650. At the conclusion of operation 1020, the argument 1040 asks if the download is from the internet or an external CD 630 memory. It is important to note, at this time when the "O" Memory 676 is not write-protected, that all memories that could be contaminated with malware are either cleared or blocked by Memory Gates 660 from any process assuring a sterile environment for downloading critical software elements.

If argument 1040 is "CD", operation 1045 allows the downloading of a new or updated secure program. If the argument 1040 is "Internet", then the internet is connected, a secure program is downloaded, and internet is disconnected per operation 1050. Outputs of operations 1045 and 1050 combine and return to previously encountered argument 960 asking if power should be removed.

In this embodiment, the Write Protect 650 function provides the necessary hardware interface between the Security Switch 640 and the "O" Memory 676 to activate or deactivate "O" Memory 676 write-protection. This Write Protect 650 is independent of the Mother Board 620 and its only input depends on the Security Switch 640. Write Protect 650 provides an indication of the write-protect status to the operator that is independent of all processes that can be affected by malware to preclude any false status.

The Security Switch 640 is a hardware implementation of a switch that activates or deactivates the Memory Gates 660 and Write Protect 650 functions. The Security Switch 640 is functionally the same as a single pole-double throw switch with make-before-brake contacts. For example, the Security Switch 640 can switch a logic "1" to the Memory Gates 660 and a logic "0" to Write Protect 650 with a logic "1" applied to both during the transition which eliminates vulnerability during the transition. The connection between the Security Switch 640 and the Mother Board 620 provides the status of the Security Switch 640 status to enable the status to be displayed on the Monitor 610; therefore allowing any Security Switch 640 hardware implementation (toggle switch, digital latch/s, etc.). Most importantly, like the Write Protect 650, the Security Switch 640 cannot be altered by any software and therefore is not vulnerable to malware.

The Memory Gates 660 function is to isolate all the non-volatile memories that could be contaminated by malware during normal operation, to assure a sterile environment for downloading secure/permanent critical programs. During this download process the Memory Gates 660 block the "E" Memory 670, the "D" Memory 672 and the "P" Memory 674. Blocking the "P" Memory 674 provides redundant protection since it is erased via operation 1005 prior to downloading. This redundant blocking protection can offset erase concerns including the remote possibility that malware impacts the erase process. The hardware implementation of the Memory Gates 660 can be, but not limited to, two input digital AND gates on each output data line of E" Memory 670, the "D" Memory 672 and the "P" Memory 674. The second input to each AND gate is connected together and to the Security Switch 640.

In addition to the advantages of NVSSD (speed, size and reliability) the "D" memory 672 can provide further isolation between internally generated uncontaminated data and internet generated potentially contaminated data. This substantially reduces the amount of data in "D" Memory 672 that could be contaminated by isolating internet data to a dedicated memory that can be easily erased periodically or when malware is suspected of impacting performance.

In addition to the advantages of NVSSD (speed, size and reliability) the "O" memory 676 can provide further isolation between critical software elements permitting write protection to stay applied to the memory areas not requiring a download.

Figure 7:
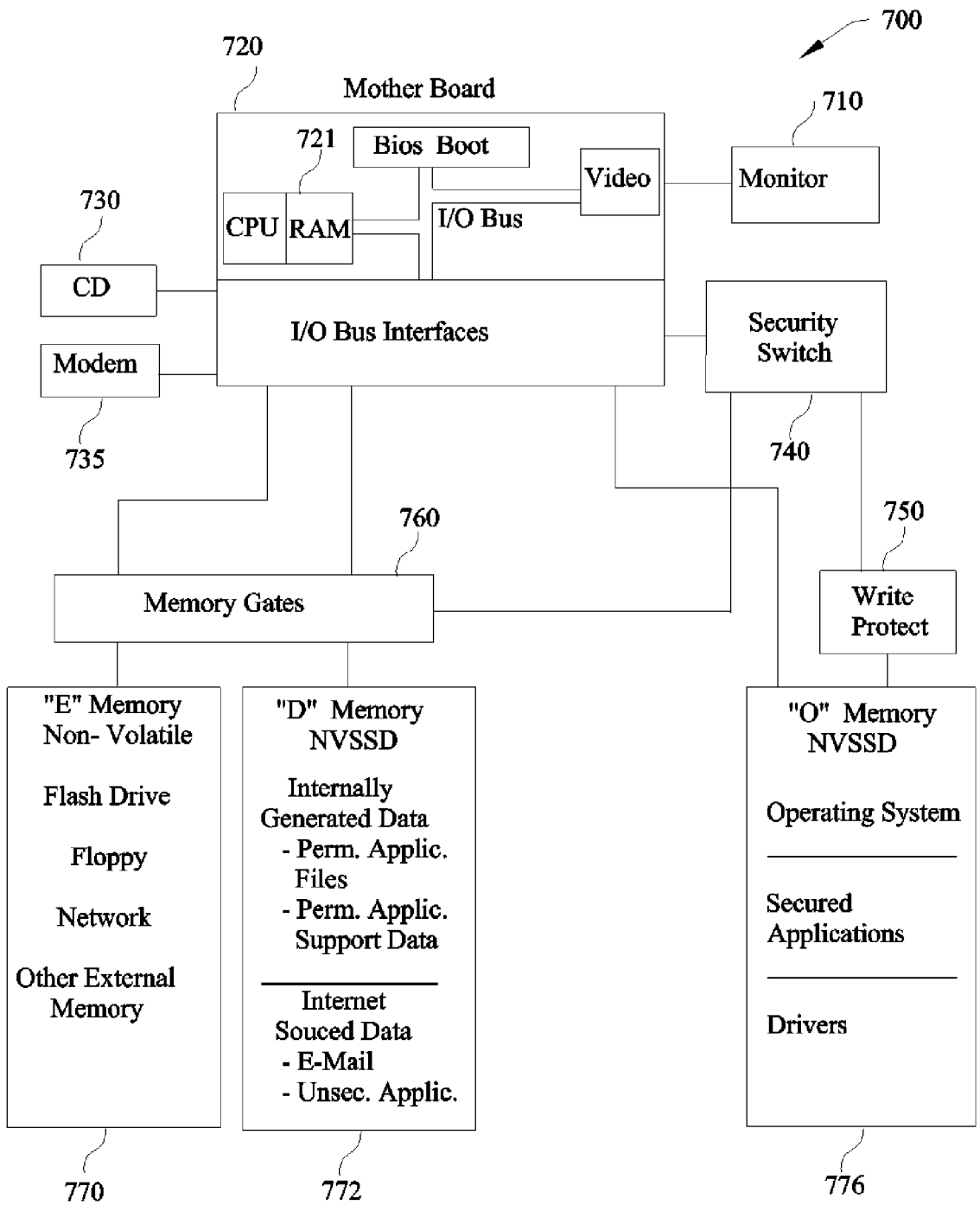
FIG. 7 is a refinement of FIG. 1 where the "O" Memory 776 is a Non-Volatile Solid State Drive (NSSD), the "P" Memory is deleted and the "D" Memory 772 is a Non-Volatile Solid State Drive (NVSSD).

The sixth embodiment block diagram is FIG. 7 is a refinement of FIG. 1 (generic block diagram); the "O" Memory 776 is a Non-Volatile Solid State Drive (NVSSD), and the "D" Memory 772 is a Non-Volatile Solid State Drive (NVSSD). Each of these memories is independent of each other in all aspects of their functionality to assure the necessary isolation for writing, reading, erasing and write-protecting. In particular, the "O" Memory 776 is isolated to be write-protected as an independent entity as opposed to partition software protection that is vulnerable to malware. Note, there is no "P" memory; with upcoming 64 bit machines that will increase possible addresses from 4 gigabytes to 16 terabytes plus the reduction in RAM costs, the RAM 721 size will likely negate the need for paging memory. There are a number of emerging NVSSD technologies that can be applied to the "O" Memory 776 and "D" memory 772 such as EEPROM, Flash Drive, MRAM, FRAM and OUM. Most promising are MRAM and Flash Drive.

The following will reference FIG. 10 (Operational Flow Diagram) and FIG. 7. Normal operation can start with operation 1005 indicating Power is OFF forcing all volatile memory to clear including RAM 721 memory. Cleansing RAM 721 memory of possible malware eliminates contamination from previous operations affecting subsequent operations IF the Security Switch 740 in argument 1015 decision is "Normal", Power is applied and Boot-UP is started per operation 1025. Operation 1025 then proceeds to operation 1035 where "O" Memory 776 is write-protected via Write Protect 750. Operation 1035 also deactivates Memory Gates 760. At this point the critical software elements that reside in the "O" Memory are protected from malware and normal computer 700 system operation 1055 can commence such as word processing, web browsing and loading/running temporary internet applications. Normal operation 1055 remains in effect until argument 1060 decision to shut down is "Yes" or if the Security Switch 740 argument 1030 decision is "DL" (download), then RAM 721 is cleared per operation 1005 before subsequent argument 1015 decides to download or proceed with normal operation.

Back to the Security Switch 740 and argument 1015, given the decision is "DL", Power is applied per operation 1010. Per operation 1020 Memory Gates 760 is then activated and "O" memory 776 write-protection is deactivated per Write Protect 750. At the conclusion of operation 1020, the argument 1040 asks if the download is from the internet or an external CD 730 memory. It is important to note, at this time when the "O" Memory 776 is not write-protected, that all memories that could be contaminated with malware are either cleared or blocked by Memory Gates 760 from any process assuring a sterile environment for downloading critical software elements.

If argument 1040 is "CD", operation 1045 allows the downloading of a new or updated secure program. If the argument 1040 is "Internet", then the internet is connected, a secure program is downloaded, and internet is disconnected per operation 950. Outputs of operations 1045 and 1050 combine and return to previously encountered argument 1060 asking if power should be removed.

In this embodiment, the Write Protect 750 function provides the necessary hardware interface between the Security Switch 740 and the "O" Memory 776 to activate or deactivate "O" Memory 776 write-protection. This Write Protect 750 is independent of the Mother Board 720 and its only input depends on the Security Switch 740. Write Protect 750 provides an indication of the write-protect status to the operator that is independent of all processes that can be affected by malware to preclude any false status.

The Security Switch 740 is a hardware implementation of a switch that activates or deactivates the Memory Gates 760 and Write Protect 750 functions. The Security Switch 740 is functionally the same as a single pole-double throw switch with make-before-brake contacts. For example, the Security Switch 740 can switch a logic "1" to the Memory Gates 760 and a logic "0" to Write Protect 750 with a logic "1" applied to both during the transition which eliminates vulnerability during the transition. The connection between the Security Switch 740 and the Mother Board 720 provides the status of the Security Switch 740 status to enable the status to be displayed on the Monitor 710; therefore allowing any Security Switch 740 hardware implementation (toggle switch, digital latch/s, etc.). Most importantly, like the Write Protect 750, the Security Switch 740 cannot be altered by any software and therefore is not vulnerable to malware.

The Memory Gates 760 function is to isolate all the non-volatile memories that could be contaminated by malware during normal operation, to assure a sterile environment for downloading secure/permanent critical programs. During this download process the Memory Gates 760 block the "E" Memory 770 and the "D" Memory 772. The hardware implementation of the Memory Gates 660 can be, but not limited to, two input digital AND gates on each output data line of E" Memory 770, and the "D" Memory 772. The second input to each AND gate is connected together and to the Security Switch 740.

In addition to the advantages of NVSSD (speed, size and reliability) the "D" memory 772 can provide further isolation between internally generated uncontaminated data and internet generated potentially contaminated data. This substantially reduces the amount of data in "D" Memory 772 that could be contaminated by isolating internet data to a dedicated memory that can be easily erased periodically or when malware is suspected of impacting performance.

In addition to the advantages of NVSSD (speed, size and reliability) the "O" memory 776 can provide further isolation between critical software elements permitting write protection to stay applied to the memory areas not requiring a download.

Having thus described the aforementioned invention, I claim:

1. Malware protection for computers that cannot be altered or compromised by any software, said malware protection is independent from any form of virus detection, said malware protection applies to computer system normal mode of operation including internet use, said malware protection applies to computer system download mode of operation that permits downloading of permanent operational software elements, said malware protection comprising:

an independent non-volatile operational system hard drive dedicated to storing software elements of a computer, said operational system hard drive is hardware write protectable;

an independent paging memory dedicated to storing paging data, said paging memory is independent of said operational system hard drive that is write protected;

an independent non-volatile data hard drive dedicated to storing application data;

memory gates that enable or disable paging outputs, data hard drive outputs and external memory outputs, said memory gates are hardware implemented and hardware invoked, said memory gates are activated to block all memories that could be malware contaminated thus providing a sterile environment when write protection of said operational system hard drive is deactivated;

a security switch that activates write protection of said operational system hard drive while deactivating said memory gates during normal said computer operation when there is no downloading of said software elements, said security switch activates said memory gates while deactivating write protection of said operational system hard drive;

a write protect function that provides the required hardware interface between said security switch and said operational system hard drive, said write protect function is only invoked by said security switch and is not programmable or altered by any software;

wherein said security switch provides an output to said write protect function to enable or disable write protection of said operational system hard drive, said security switch provides an output to said memory gates that activates or deactivates memory blocking, said security switch provides an output to the CPU to facilitate displaying of said security switch status, said security switch is functionally a single pole double throw switch with make before break contacts enabling said write protection before said memory gates are deactivated; said security switch is independent from all software;

wherein said memory gates are hardware implemented with digital 2-input gates where one input is a data input and the second input is the activation input from said security switch, said memory gates enable or disable paging outputs, data hard drive outputs and external memory outputs simultaneously, said memory gates activation inputs are connected together and to the output of said security switch; and wherein said write protect function transforms the output from said security switch to the particular required inputs of the operational system hard drive, said write protect function is independent of all software.

2. The method according to claim 1 wherein said paging memory is implemented with a physically independent hard drive that is erasable by formatting or other means to cleanse said paging memory of possible malware.

3. The method according to claim 1 wherein said paging memory is implemented with a physically independent non-volatile solid state drive that is erasable to cleanse said paging memory of possible malware.

4. The method according to claim 1 wherein said paging memory is implemented with independent volatile solid state memory that is erased when power is removed to cleanse said paging memory of possible malware.

5. The method according to claim 1 wherein said paging memory is eliminated by said computer addressing that can accommodate sufficient said computer random access memory to negate the need for said paging memory, eliminating said paging memory that could contain malware contamination thus negating the need for power down clearing plus reduces the size of said memory gates.

6. Malware protection for computers that cannot be altered or compromised by any software, said malware protection is independent from any form of virus detection, said malware protection applies to computer system normal mode of operation including internet use, said malware protection applies to computer system download mode of operation that permits downloading of permanent operational software elements, said malware protection comprising:

an independent non-volatile operational system hard drive dedicated to storing software elements of a computer, said operational system hard drive is hardware write protectable;

an independent paging memory dedicated to storing paging data, said paging memory is independent of said operational system hard drive that is write protected;

an independent non-volatile data solid state drive dedicated to storing application data, said data solid state drive can be partitioned allowing a dedicated memory area devoted to secure internally saved data verses potentially malware contaminated data received from the internet, segregating secure data from potentially insecure data;

memory gates that enable or disable operational system hard drive outputs, paging outputs, data solid state drive data outputs and external memory outputs, said memory gates are hardware implemented and hardware invoked, said memory gates are activated to block all memories that could be malware contaminated thus providing a sterile environment when write protection of said operational hard drive is deactivated;

a security switch that activates write protection of said operational system hard drive while deactivating said memory gates during normal said computer operation when there is no downloading of said software elements, said security switch activates said memory gates while deactivating write protection of said operational system hard drive;

a write protect function that provides the required hardware interface between said security switch and said operational system hard drive, said write protect function is only invoked by said security switch and is not programmable or altered by any software;

wherein said security switch provides an output to said write protect function to enable or disable write protection of said operational system hard drive, said security switch provides an output to said memory gates that activates or deactivates memory blocking, said security switch provides an output to the CPU to facilitate displaying of said security switch status, said security switch is functionally a single pole double throw switch with make before break contacts enabling said write protection before said memory gates are deactivated, said security switch is independent from all software;

wherein said memory gates are hardware implemented with digital 2-input gates where one input is a data input and the second input is the activation input from said security switch, said memory gates enable or disable paging outputs, data hard drive outputs and external memory outputs simultaneously, said memory gates activation inputs are connected together and to the output of said security switch;

wherein said write protect function transforms the output from said security switch to the particular required inputs of the operational system hard drive, said write protect function is independent of all software.

7. The method according to claim 6 wherein said paging memory is implemented with a physically independent hard drive that is erasable by formatting or other means to cleanse said paging memory of possible malware.

8. The method according to claim 6 wherein said paging memory is implemented with a physically independent non-volatile solid state drive that is erasable to cleanse said paging memory of possible malware.

9. The method according to claim 6 wherein said paging memory is implemented with independent volatile solid state memory that is erased when power is removed to cleanse said paging memory of possible malware.

10. The method according to claim 6 wherein said paging memory is eliminated by said computer addressing that can accommodate sufficient said computer random access memory to negate the need for said paging memory, eliminating said paging memory that could contain malware contamination thus negating the need for power down clearing plus reduces the size of said memory gates.

11. Malware protection for computers that cannot be altered or compromised by any software, said malware protection is independent of any form of virus detection, said malware protection applies to computer system normal mode of operation including internet use, said malware protection applies to computer system download mode of operation that permits downloading of permanent operational software elements, said malware protection comprising:

an independent non-volatile operational system solid state drive dedicated to storing software elements of a computer, said operational system solid state drive is hardware write protectable, said operational systems solid state drive can be modular allowing a dedicated memory area devoted to individual elements of software;

for said operational systems solid state drive said write protect function deactivates write protection on all software elements stored in that drive but in the case of said operational systems solid state drive only the software element requiring change will have write protection deactivated;

an independent paging memory dedicated to storing paging data, said paging memory is independent of said operational system solid state drive that is write protected;

an independent non-volatile data solid state drive dedicated to storing application data, said data solid state drive can be partitioned allowing a dedicated memory area devoted to secure internally saved data verses potentially malware contaminated data received from the internet, segregating secure data from potentially insecure data;

memory gates that enable or disable operational system solid state drive outputs, paging outputs, data solid state drive data outputs and external memory outputs, said memory gates are hardware implemented and hardware invoked, said memory gates are activated to block all memories that could be malware contaminated thus providing a sterile environment when write protection of said operational hard drive is deactivated;

a security switch that activates write protection of said operational system solid state drive while deactivating said memory gates during normal said computer operation when there is no downloading of said software elements, said security switch activates said memory gates while deactivating write protection of said operational system solid state drive;

a write protect function that provides the required hardware interface between said security switch and said operational system solid state drive, said write protect function is only invoked by said security switch and is not programmable or altered by any software;

wherein said security switch provides an output to said write protect function to enable or disable write protection of said operational system solid state drive, said security switch provides an output to said memory gates that activates or deactivates memory blocking, said security switch provides an output to the CPU to facilitate displaying of said security switch status, said security switch is functionally a single pole double throw switch with make before break contacts enabling said write protection before said memory gates are deactivated; said security switch is independent from all software;

wherein said memory gates are hardware implemented with digital 2-input gates where one input is a data input and the second input is the activation input from said security switch, said memory gates enable or disable paging outputs, data hard drive outputs and external memory outputs simultaneously, said memory gates activation inputs are connected together and to the output of said security switch; and wherein said write protect function transforms the output from said security switch to the particular required inputs of the operational system solid state drive, said write protect function is independent of all software.

12. The method according to claim 11 wherein said paging memory is implemented with a physically independent hard drive that is erasable by formatting or other means to cleanse said paging memory of possible malware.

13. The method according to claim 11 wherein said paging memory is implemented with a physically independent non-volatile solid state drive that is erasable to cleanse said paging memory of possible malware.

14. The method according to claim 11 wherein said paging memory is implemented with independent volatile solid state memory that is erased when power is removed to cleanse said paging memory of possible malware.

15. The method according to claim 11 wherein said paging memory is eliminated by said computer addressing that can accommodate sufficient said computer random access memory to negate the need for said paging memory, eliminating said paging memory that could contain malware contamination thus negating the need for power down clearing plus reduces the size of said memory gates.

* * * * *